US007074003B2

(12) United States Patent
Klein

(10) Patent No.: US 7,074,003 B2
(45) Date of Patent: Jul. 11, 2006

(54) HELICOPTER MOVING DEVICE

(76) Inventor: Donald R. Klein, Box 1042, Edmonton, Alberta (CA) T5J 2M1

(*) Notice: Subject to any disclaimer, the term of this patent is extended or adjusted under 35 U.S.C. 154(b) by 53 days.

(21) Appl. No.: 10/799,719

(22) Filed: Mar. 15, 2004

(65) Prior Publication Data
US 2004/0223834 A1   Nov. 11, 2004

Related U.S. Application Data

(60) Provisional application No. 60/469,009, filed on May 9, 2003.

(51) Int. Cl.
*B66F 5/00* (2006.01)
(52) U.S. Cl. ............... 414/495; 244/17.17; 254/131; 280/43.23; 280/402
(58) Field of Classification Search ........... 414/495; 254/131; 280/43.23, 402
See application file for complete search history.

(56) References Cited

U.S. PATENT DOCUMENTS

| 2,826,431 | A | * | 3/1958 | Able et al. ............... 280/474 |
| 2,826,434 | A | * | 3/1958 | Echols ................ 280/490.1 |
| 3,009,711 | A | * | 11/1961 | White ................ 280/43.23 |
| 3,417,833 | A | * | 12/1968 | McRae ................. 180/19.1 |
| 3,761,040 | A | * | 9/1973 | Cummins ................ 244/2 |
| 4,289,212 | A | * | 9/1981 | Immel .................. 180/19.1 |
| 4,488,612 | A | * | 12/1984 | Patterson .............. 180/14.1 |
| 4,516,744 | A | * | 5/1985 | Burnside .............. 244/17.17 |
| 4,603,869 | A | * | 8/1986 | Maxwell ................. 280/11 |
| 5,056,981 | A |   | 10/1991 | Knowles |
| 5,071,151 | A | * | 12/1991 | Irwin ................... 280/402 |
| 5,655,733 | A | * | 8/1997 | Roach .................... 244/50 |
| 6,325,403 | B1 |  | 12/2001 | Brutger |
| D455,114 | S |   | 4/2002 | Carter |
| 6,450,756 | B1 | * | 9/2002 | Stahancyk et al. ......... 414/426 |

OTHER PUBLICATIONS

"Robinson Two-Carts for R22 & R44 Helicopters", brochure, as found on company website, known to the inventor at least as early as May 2003, date unknown.

* cited by examiner

*Primary Examiner*—Thomas J. Brahan

(57) ABSTRACT

A helicopter moving device has a lever arm, a helicopter support arm to attach to a helicopter, and a wheel mounted to the lever arm, such that applying downward pressure to the lever arm causes a corresponding upward movement of the helicopter support arm about a pivot point. In this manner, the helicopter may be moved from place to place along the ground. The helicopter moving device is lightweight, capable of being disassembled, self propelled (does not require external power source) and portable.

3 Claims, 4 Drawing Sheets

HELICOPTER MOVING DEVICE

CROSS-REFERENCE TO RELATED APPLICATIONS

This application claims priority from U.S. Provisional Patent Application 60/469,009 filed May 9, 2003, the disclosure of which is herein incorporated by reference.

BACKGROUND OF THE INVENTION

Helicopters sit where they land. Once on the ground, the helicopter must be manoeuvred into a hangar or other berth if it is desired to provide shelter for the helicopter. One way to do this is to use the wheels on the skids of the helicopter, which are located at the back. The person on the ground then goes to the tail of the helicopter and pulls down, thus raising the skids enough to move the craft forward. This combination of pulling and pushing and steering can be both challenging and strenuous, and a high degree of manhandling is often necessary, particularly where the terrain is uneven.

Helicopter owners seeking to avoid this exercise may resort to the addition of further wheels to the skids. However, this can be expensive, may require compliance with both helicopter manufacturer and regulatory requirements, and still not achieve the desired result of easy movement. The wheels are not large, and whether there are two or more of them, negotiating uneven surfaces, particularly where there are ruts or mud or long grass, remains a challenge.

Another option for helicopter owners requires deft flying and involves landing on a trailer that is then towed to the desired location. This solves the challenge of moving the craft on the ground, but severely limits the options of the pilot as to where to land, and does not solve the problem should the pilot decide to put down somewhere else.

A further solution is some manner of dolly, which may be large, weighing hundreds of pounds, and involve a lifting means that goes under the belly of the helicopter, raising it off the ground enough so that the dolly cart can then be pushed or pulled and steered into place. If the dolly is motorized, the task need not be strenuous. However, care must be taken to balance the craft on the belly to avoid unsettling during transport. Likewise, the same limitations posed by the trailer remain.

SUMMARY OF THE INVENTION

To address these problems, the present invention discloses a helicopter moving device that requires no modifications of the aircraft, that is easy to use and requires little in the way of strength, and that is lightweight and portable, thus permitting the helicopter pilot to take it along and use it in any number of locations.

Therefore, there is provided according to one aspect of the invention, a helicopter moving device, comprising a lever having a fulcrum and a helicopter skid connector attached to the lever in a position such that movement of the lever in an arc about the fulcrum causes a corresponding movement of the helicopter skid connector that is capable of lifting a helicopter. In a further aspect of the invention, there is provided a helicopter moving device comprising a helicopter support arm, a lever arm connected to the helicopter support arm at a joint and extending laterally away from the helicopter support arm, and a wheel mounted on the lever arm, such that movement of the handle in an arc about the wheel causes a corresponding movement of the helicopter support arm that is capable of lifting a helicopter.

In one of several further aspects of the invention, the device further comprises a handlebar attached to the lever arm. A motor may be attached to a drive mechanism and the drive mechanism attached to the wheel for propelling the wheel, and provided with a clutch for disengaging the drive mechanism. Both the lever arm and support arm may be telescoping. The lever arm preferably pivots in relation to the support arm, with a releasable pin. Clamps on the ends of the support arm engage the skids of the helicopter and form a helicopter skid connector. The clamps are preferably lined with resilient and non-slip material.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

In this patent document, the word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

Figure 1:
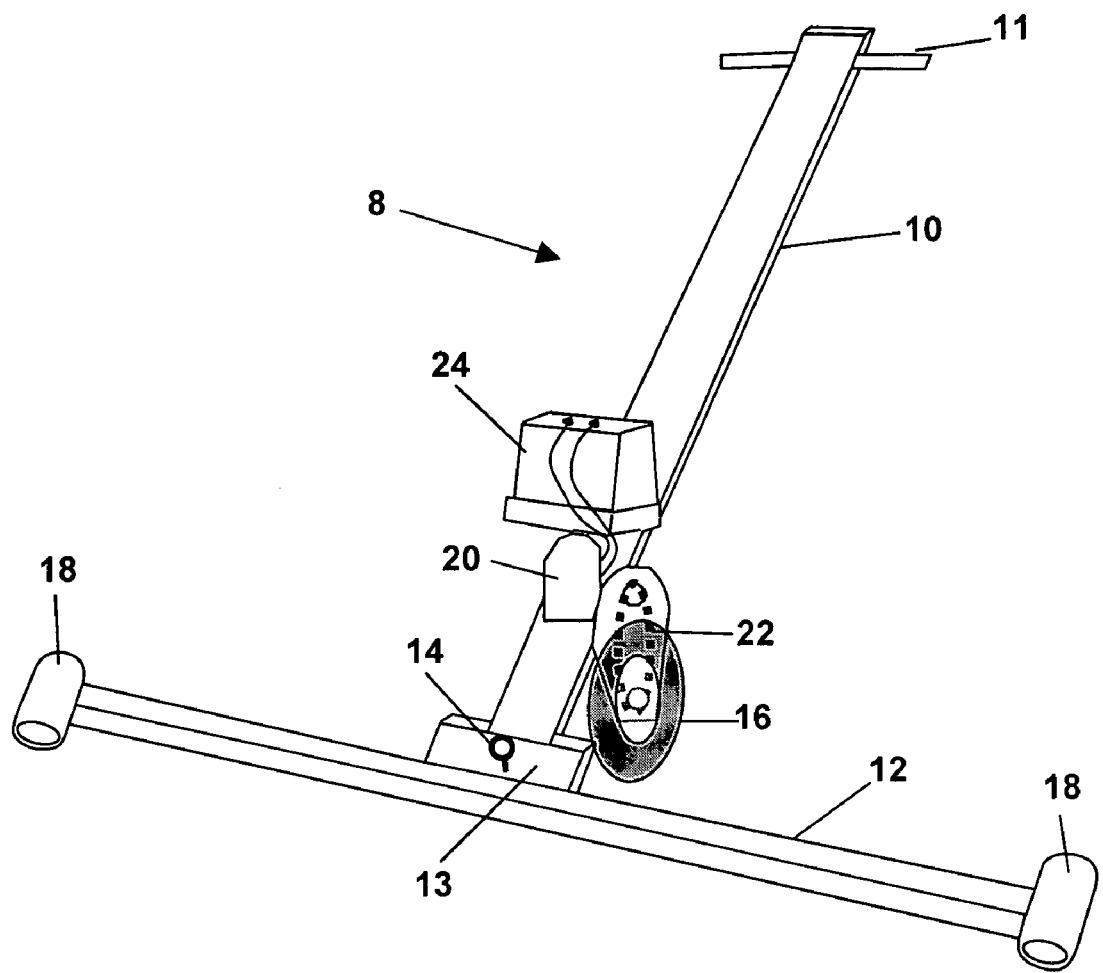
FIG. 1 is a top, plan view of the device of the present invention.
Figure 2:
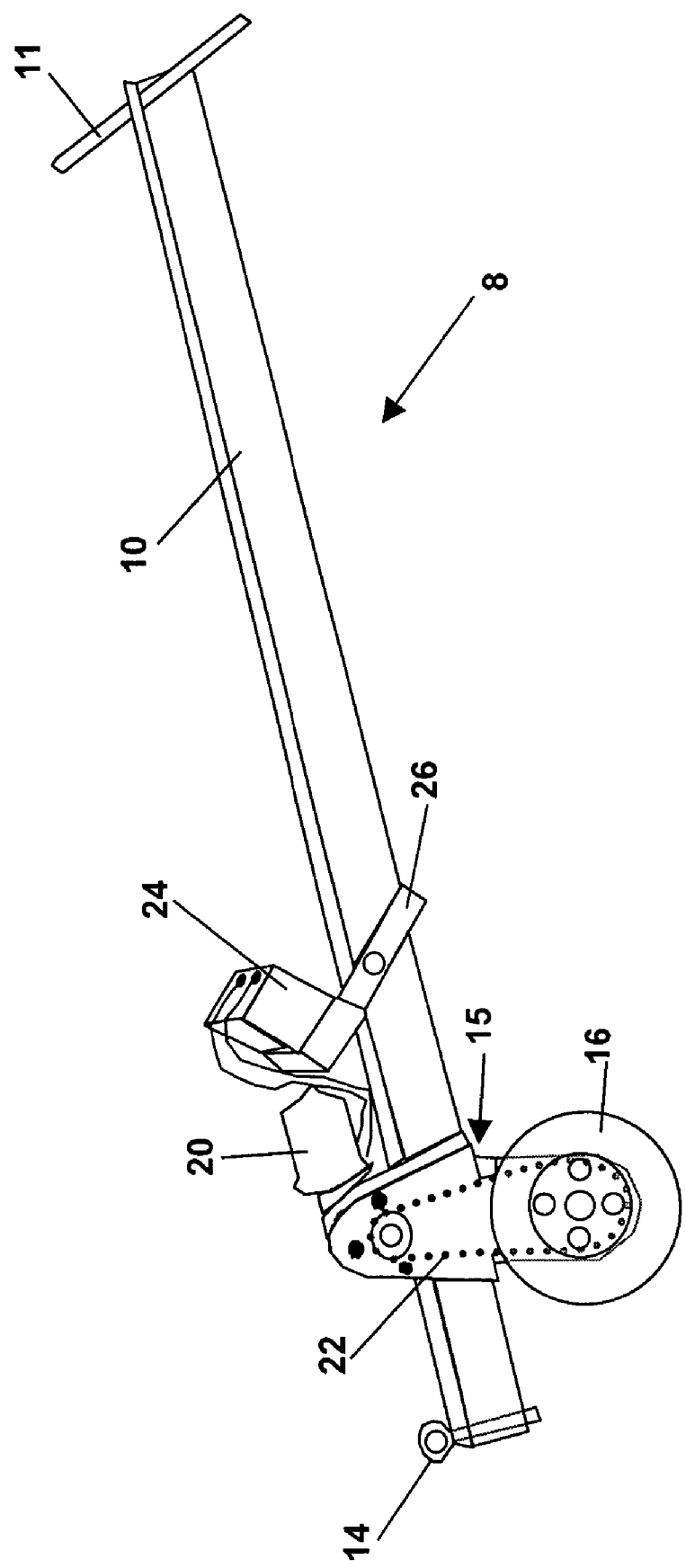
FIG. 2 is a side view of the lever arm of the present invention.

As shown in FIGS. 1 and 2, the helicopter moving device 8 has a lever arm 10 and a helicopter support arm 12, the lever arm 10 connected to the helicopter support arm 12 at a joint 13 and extending laterally away from the helicopter support arm 12. The lever arm 10 and the helicopter support arm 12 may be welded at the joint 13. However, this is not preferred as it limits the portability of the device 8. In a preferred embodiment, the lever arm 10 attaches to the helicopter support arm 12 at the middle of the helicopter support arm 12 by a pivot 14. The lever arm 10 and the helicopter support arm 12 may be made of any suitable material, but in the preferred embodiment, they are made of aircraft aluminum because it is lightweight. The lever arm 10 and the helicopter support arm 12 may be telescoping in order to adjust to multiple positions. The lever arm 10 may have a handlebar 11 attached perpendicularly to the end of the lever bar 10 for greater ease of use. The pivot or other fastening means 14 may be a pin or other suitable means for holding the lever arm 10 securely to the helicopter support arm 12. The fastening means 14 may be removable, to permit separation of the lever arm 10 from the helicopter support arm 12. Preferably, the pivot 14 permits rotation of the lever arm 10 to the support arm 12 in an arc in the plane of the two arms that covers up to 180 degrees, 90 degrees on each side of the position in which the lever arm 10 is at a right angle to the support arm 12. This allows steering of the device, and it is desirable to be able to steer over a 180 degree range.

Figure 3:
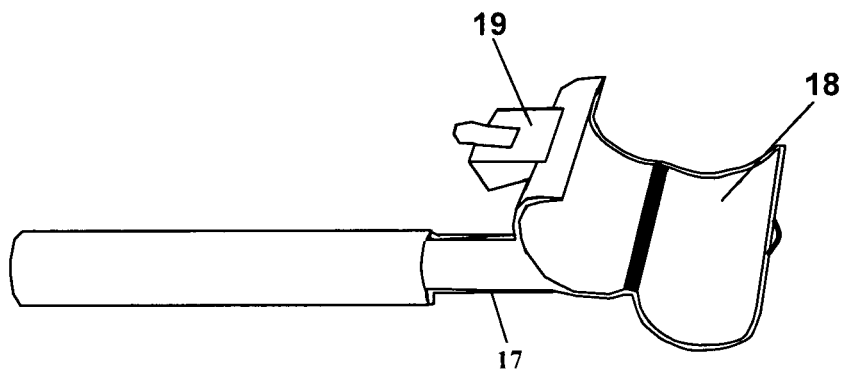
FIG. 3 is a close-up top, plan view of one of the clamps of the present invention.

At the ends of the helicopter support arm 12 is a helicopter skid connector formed of clamps 18. As shown in FIG. 3, the clamps 18 in a preferred embodiment are clamshells capable of closing around the ends of helicopter skids. The clamps 18 may be lined with any non-slip and resilient material such as rubber so as to prevent marring of the skid surface and to grip the skid more securely. The clamps 18 may be provided with any suitable locking means 19 for locking them closed. The clamps 18 are each attached to a respective tube or rod 17 that slides into the ends of the support arm 12, in a tube in tube arrangement that provides lateral adjustment for ease of accommodating helicopters with varying width of skid. The clamps 18 are bent in a pipe bending shop to match the curve of the skid at its forward point.

Attached to the lever arm 10 is at least one wheel 16 mounted with a mount 15 on the lever arm 10, such that movement of the lever arm 10 in a vertical arc about wheel 16 causes a corresponding movement of the helicopter support arm 12 about the wheel 16 to lift a helicopter. The base of the wheel 16 where it contacts the ground becomes a fulcrum for the lever 10. The wheel 16 is of sufficient size to provide leverage when the lever arm 10 is pushed downward. The wheel 16 preferably has a friction surface, such as provided by a sanded finish or spikes. An additional wheel or wheels may be provided for balance. The wheel 16 is attached to a motor 20 by means of a drive mechanism 22. The drive mechanism 22 may be a chain drive or a friction drive. The motor 20 is preferably powered by a battery 24. The motor 20 may be any motor suitable to drive the wheel, but in a preferred embodiment, the motor 20 is thermally protected, reversible, and reliable, and operates at less than ½ hp, such as, for example, a windshield wiper motor from an automobile. The battery 24 attaches to the lever arm 10 by means of platform 26 which extends outwardly from the lever arm 10. The platform 26 may also fold up parallel to the lever arm 10 for ease of storage. The battery 24 may be any battery of sufficient voltage to power the motor 20, but in the preferred embodiment, the battery 24 is a gel cell battery. This is better for transport because the gel cell battery is non-spillable.

Figure 4:
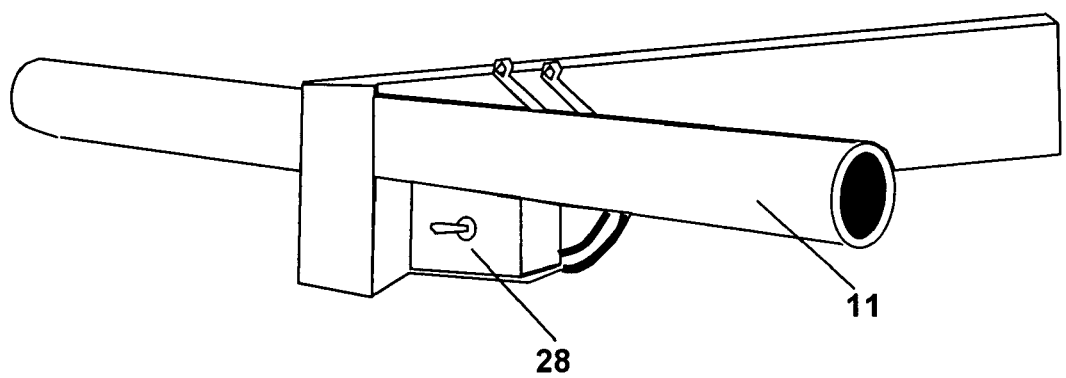
FIG. 4 is a close-up perspective view of the handlebar of the present invention.
Figure 5:
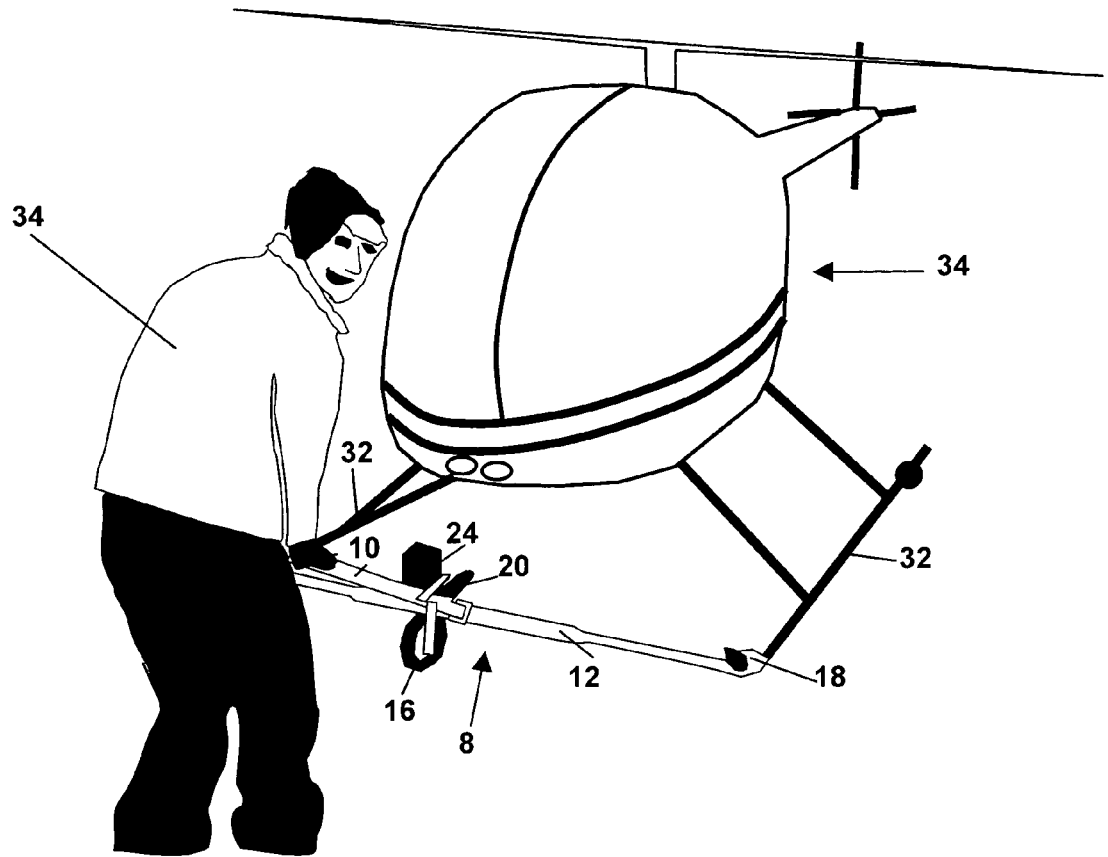
FIG. 5 is a perspective view of the device of the present invention in operation.

The drive mechanism 22 may have a clutch (not shown) to permit engagement or disengagement of the drive mechanism 22. If disengaged, the helicopter moving device 8 becomes free wheeling and can be used either purely through human power or can be attached to an ATV or small tractor to permit towing of the helicopter from one location to another. The drive mechanism 22 may be equipped with a forward and reverse direction. The motor 20 is attached to a switch 28 to activate the motor 20. As shown in FIG. 4 the switch may be a start/stop button, a trigger switch, a throttle, or similar means for activating the motor when engaged and stopping the motor when released.

To operate the device 8, the operator 30 wheels the device 8 into position under the skid ends 32, at the front of the helicopter, so that the clamps 18 are aligned with skid ends 32. This may require some adjustment in telescoping the helicopter support arm 12 to the desired width. The clamps 18 are then closed around the skid ends 32 and locked into place. The operator 30 then pushes down on the lever arm 10, which results in the helicopter support arm 12 moving upward. The operator 30 then engages the clutch, selects forward or reverse as desired, and engages the switch 28. The helicopter 34 can then be steered at a slow walk to the desired location. Once it is in place, the switch 28 is released and the device 8 stops. The operator 32 then ceases applying downward pressure on the lever arm 10, which results in the helicopter support arm 12 being lowered to the ground. The helicopter 34 then comes to rest on the ground. The operator 30 then opens the clamps 18, releases the clutch, and pulls the device 8 away from the helicopter 34.

Likewise, if the battery 24 fails or the operator 30 chooses not to use it, the device 8 can still be used with relatively little effort. In this case, the operator 30 makes sure the clutch is disengaged so as to permit the wheel 16 to be free-wheeling. By pushing down on the lever arm 10, the helicopter support arm 12 is lifted off the ground, thereby lifting the skid ends 32 of the helicopter 34 off the ground so that the helicopter 34 can be pushed or pulled as desired. Whether in the manual or the mechanized mode, the device 8 may be stopped by ceasing to push down on the lever arm 10.

Assembly and disassembly of the device is equally simple. The battery 24 mounted on the lever arm 10 is removed by disconnecting two terminal wires and wing nuts. The pin 14 connecting the helicopter support arm 12 to the lever arm 10 is removed. Finally, the helicopter support arm 12 and the lever arm 10 are telescoped into their most compact positions. The entire device 8 when disassembled can then be stowed in the passenger seat of a helicopter or the seat or trunk of any car. Likewise, the battery 24 can be easily stowed beneath the seat of most helicopters.

The relative and absolute lengths of the portions of the lever arm 10 on either side of the wheel mount 15 is selected for the comfort of the operator. The position of the wheel on lever arm is preferably made adjustable by sliding of the wheel mount 15 along the lever arm 10. The lever arm 10 may be made telescoping to allow adjustment in the field, and to allow the device to be folded for transport, such as under a seat in a helicopter. For a 400 kg helicopter, it is desirable to lift the helicopter off the ground about 5 cm. The lever arm 10 should reach up to about shoulder level on the operator when the clamps 18 are in operating position but the helicopter has not yet been lifted, and be moved down to between waist level and chest level for movement of the helicopter, although waist level has been found suitable. An 8:1 ratio for the leverage of the lever arm has been found suitable, where 10 lbs of pressure moving through 16 inches lifts 80 lbs weight through 2 inches, as an example.

For ease of transport, it is desirable to make the device collapsible, with telescoping or foldable lever and support arms, to fit into a space 20 inches by 11 inches by 9 inches, and a total weight of no more than about 16 lbs including the battery. The invention described can thus be seen to be a device that allows for easy attachment and extremely safe moving of the helicopter by the pilot or anyone authorized, with little or no effort. The clamps allow the device to be attached simply and in seconds, without changes to helicopter or the two attachment points. The clamps are safe and provide low risk of damage to the helicopter. The motor and battery allow the device to be self-propelled with built in power, which may be operated in forward and reverse with a flick of a thumb switch. The T-handle provides for manual assist and operation, while aluminum or other lightweight material used in conjunction with its design allows the device to be extremely light and strong. The adjustable clamp width allows for different size helicopters or when the landing gear widens from use. A suitable battery provides long lasting, portable, built in, rechargeable power source, as for example about 1 hour per 20 minute charge. The device may be used on rough terrain, or as a tow bar, with optional adjustable hitch for any tractor, quad, mower or other vehicle. The device can be stopped by simply letting go of the device, or flicking the thumb switch to neutral. The described device requires only the rear fixed or detachable wheels traditionally supplied with all helicopters with skid type landing gear.

A person skilled in the art could make immaterial modifications to the invention described in this patent document without departing from the invention. A further embodiment comprises a device with wheels at either side of the support bar, with the skid clamps on stub arms extending away from the support bar on the other side of the support bar from the lever. The wheels again provide the fulcrum, while the arms on the clamps extend a sufficient distance to provide appropriate leverage. In this embodiment, the clamps may still be connected to the stub arms by a tube in sleeve connection. The clamps may be mounted on rods as in the embodiment shown, and a sleeve on the stub arms may receive the rods. A motor can be used as in the embodiment shown to drive both wheels.

What is claimed is:

1. A helicopter moving device, for operation by an individual to move a helicopter having skids and rear wheels on the skids, the helicopter moving device comprising:
   a lever having a fulcrum, the lever having a length suitable for operation by an individual;
   a helicopter skid connector including a helicopter support arm having opposed ends, each of the opposed ends having a clamp for connecting to a different one of the skids of a helicopter, the helicopter skid connector attached to the lever at a joint in a position such that movement of the lever in an arc about the fulcrum causes a corresponding movement of the helicopter skid connector that is capable of lifting a helicopter at one end of the helicopter to allow movement of the helicopter on the rear wheels of the helicopter by an individual operating the lever;
   a wheel mounted on the lever and acting as the fulcrum;
   a handlebar attached to the lever;
   a motor attached to a drive mechanism and the drive mechanism attached to the wheel for propelling the wheels;
   the clamps being arranged for lateral adjustment on the helicopter support arm; and
   the helicopter support arm being pivotally attached to the lever to rotate in a plane that contains both the lever and helicopter support arm.

2. The helicopter moving device of claim 1 in which the helicopter support arm is pivotally attached to the lever with a releasable pin.

3. The helicopter moving device of claim 1 in which the helicopter support arm is telescoping.

* * * * *